United States Patent
Kim

(10) Patent No.: US 9,514,672 B2
(45) Date of Patent: Dec. 6, 2016

(54) PIXEL CIRCUIT, ORGANIC LIGHT EMITTING DISPLAY DEVICE, AND METHOD OF DRIVING THE PIXEL CIRCUIT

(71) Applicant: Samsung Display Co., Ltd., Yongin, Gyeonggi-do (KR)

(72) Inventor: Hyung-Soo Kim, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 391 days.

(21) Appl. No.: 13/708,710

(22) Filed: Dec. 7, 2012

(65) Prior Publication Data

US 2014/0002436 A1    Jan. 2, 2014

(30) Foreign Application Priority Data

Jun. 28, 2012 (KR) .................. 10-2012-0070284

(51) Int. Cl.
| | | |
|---|---|---|
| G09G 3/3208 | (2016.01) | |
| G09G 3/32 | (2016.01) | |
| H05B 37/00 | (2006.01) | |
| H05B 33/08 | (2006.01) | |

(52) U.S. Cl.
CPC .......... *G09G 3/3208* (2013.01); *G09G 3/3233* (2013.01); *H05B 33/0896* (2013.01); *H05B 37/00* (2013.01)

(58) Field of Classification Search
CPC G09G 3/3208; G09G 3/3233; H05B 33/0896; H05B 37/00
See application file for complete search history.

(56) References Cited

U.S. PATENT DOCUMENTS

| | | | | |
|---|---|---|---|---|
| 7,250,720 | B2* | 7/2007 | Sakakura et al. | 313/506 |
| 7,580,012 | B2* | 8/2009 | Kim et al. | 345/76 |
| 7,663,578 | B2* | 2/2010 | Miyake | 345/76 |
| 7,843,408 | B2* | 11/2010 | Yamazaki et al. | 345/77 |
| 7,928,937 | B2* | 4/2011 | Ozaki | 345/82 |
| 8,743,104 | B2* | 6/2014 | Tsai et al. | 345/211 |
| 2003/0058200 | A1* | 3/2003 | Numao | 345/76 |

(Continued)

FOREIGN PATENT DOCUMENTS

| | | |
|---|---|---|
| KR | 1020060110202 A | 10/2006 |
| KR | 1020070029453 A | 3/2007 |
| KR | 1020090071861 A | 7/2009 |

*Primary Examiner* — Kevin M Nguyen
*Assistant Examiner* — Sejoon Ahn
(74) *Attorney, Agent, or Firm* — Knobbe Martens Olson & Bear LLP

(57) ABSTRACT

A pixel circuit including a first through fifth PMOS transistors, a storage capacitor and an organic light emitting diode is disclosed. The first and second PMOS transistors are connected in serial between a first voltage and a first node. The third and fourth PMOS transistors are connected in serial between a second voltage and the first node. Gate electrodes of the first and third PMOS transistors are connected to a scan line. A gate electrode of the second PMOS transistor is connected to a first data line. A gate electrode of the fourth PMOS transistor is connected to a second data line. The fifth PMOS transistor is connected between a first power supply voltage and the organic light emitting diode and has a gate electrode connected to the first node. The storage capacitor is connected between the first node and a first electrode of the fifth PMOS transistor.

18 Claims, 13 Drawing Sheets

(56) References Cited

U.S. PATENT DOCUMENTS

| | | | | |
|---|---|---|---|---|
| 2003/0085828 | A1* | 5/2003 | Tsutsui | G09G 3/3233 341/144 |
| 2005/0052377 | A1* | 3/2005 | Hsueh | G09G 3/3233 345/82 |
| 2005/0201508 | A1* | 9/2005 | Shin | G09G 3/3677 377/10 |
| 2005/0243076 | A1* | 11/2005 | Kim et al. | 345/204 |
| 2006/0023002 | A1* | 2/2006 | Hara | G09G 3/3283 345/690 |
| 2006/0107146 | A1* | 5/2006 | Kim et al. | 714/727 |
| 2006/0114193 | A1* | 6/2006 | Kwak | G09G 3/3233 345/76 |
| 2006/0125737 | A1* | 6/2006 | Kwak | G09G 3/3233 345/76 |
| 2006/0125807 | A1* | 6/2006 | Park | G09G 3/3233 345/204 |
| 2006/0132668 | A1* | 6/2006 | Park | G09G 3/3233 349/48 |
| 2006/0139253 | A1* | 6/2006 | Choi | G09G 3/3233 345/76 |
| 2006/0244689 | A1* | 11/2006 | Osame et al. | 345/76 |
| 2007/0024547 | A1* | 2/2007 | Jang | G09G 3/3233 345/81 |
| 2007/0262935 | A1* | 11/2007 | Shin | G09G 3/3291 345/84 |
| 2008/0246717 | A1* | 10/2008 | Miyake | G09G 3/3677 345/92 |
| 2010/0073282 | A1* | 3/2010 | Murayama | 345/107 |
| 2011/0074838 | A1* | 3/2011 | Yamamoto et al. | 345/690 |
| 2012/0019503 | A1* | 1/2012 | Lee | G09G 3/3659 345/211 |
| 2012/0086327 | A1* | 4/2012 | Asano | 313/498 |
| 2012/0206467 | A1* | 8/2012 | Shih | G09G 3/344 345/545 |
| 2013/0038595 | A1* | 2/2013 | Yamashita et al. | 345/212 |
| 2014/0139505 | A1* | 5/2014 | Han | H04N 13/0438 345/212 |
| 2014/0306946 | A1* | 10/2014 | Senda | G09G 3/3258 345/212 |

* cited by examiner

PIXEL CIRCUIT, ORGANIC LIGHT EMITTING DISPLAY DEVICE, AND METHOD OF DRIVING THE PIXEL CIRCUIT

CROSS-REFERENCE TO RELATED APPLICATION

This application claims priority under 35 USC §119 to Korean Patent Application No. 10-2012-0070284, filed on Jun. 28, 2012 in the Korean Intellectual Property Office (KIPO), the contents of which are herein incorporated by reference in their entirety.

BACKGROUND

Field

Example embodiments relate generally to display devices, and more particularly to pixel circuits, organic light emitting display devices including the pixel circuits, and methods of driving the pixel circuits.

Description of the Related Technology

Various flat panel display devices that reduce weight and volume have been developed. Flat panel display devices include a liquid crystal display (LCD) device, a field emission display (FED) device, a plasma display panel (PDP), an organic light emitting display (OLED) device, etc. The OLED device has advantages such as rapid response speed and low power consumption because the OLED device among the flat panel display devices displays an image using an organic light emitting diode that emits light based on recombination of electrons and holes.

Typically, the OLED device may be divided into a passive matrix type organic light emitting display (PMOLED) device and an active matrix type organic light emitting display (AMOLED) device according to a method of driving organic light emitting elements. The AMOLED device has a plurality of scan lines, a plurality of data lines, a plurality of power supply voltage lines, and a plurality of pixel circuits. The AMOLED device may control a gray level of each pixel circuit by adjusting voltage data or current data (e.g., an analog driving scheme), or by adjusting a light emitting time (e.g., a digital driving scheme). The AMOLED device operating based on the digital driving scheme has low power consumption in a light emitting operation. In the AMOLED device operating based on the digital driving scheme, however, power consumption for charging and discharging the data lines increases because data are written into the data lines with relatively high speed as resolution of the AMOLED device is increased.

SUMMARY

Accordingly, the present embodiments are provided to substantially obviate one or more problems due to limitations and disadvantages of the related art.

Some example embodiments provide a pixel circuit capable of operating based on a digital driving scheme and reducing power consumption for charging and discharging a data line.

Some example embodiments provide an organic light emitting display device that includes at least one pixel circuit capable of operating based on a digital driving scheme and reducing power consumption for charging and discharging a data line.

Some example embodiments provide a method of driving a pixel circuit capable of operating based on a digital driving scheme and reducing power consumption for charging and discharging a data line.

According to example embodiments, a pixel circuit includes a first p-type metal oxide semiconductor (PMOS) transistor, a second PMOS transistor, a third PMOS transistor, a fourth PMOS transistor, a fifth PMOS transistor, a storage capacitor and an organic light emitting diode. The first PMOS transistor has a first electrode connected to a first voltage, a gate electrode connected to a scan line, and a second electrode. The second PMOS transistor has a first electrode connected to the second electrode of the first PMOS transistor, a gate electrode connected to a first data line, and a second electrode connected to a first node. The third PMOS transistor has a first electrode connected to a second voltage, a gate electrode connected to the scan line, and a second electrode. The fourth PMOS transistor has a first electrode connected to the second electrode of the third PMOS transistor, a gate electrode connected to a second data line, and a second electrode connected to the first node. The fifth PMOS transistor has a first electrode connected to a first power supply voltage, a gate electrode connected to the first node, and a second electrode. The storage capacitor has a first electrode connected to the first node, and a second electrode connected to the first electrode of the fifth PMOS transistor. The organic light emitting diode has an anode electrode connected to the second electrode of the fifth PMOS transistor, and a cathode electrode connected to a second power supply voltage.

The pixel circuit may be included in an organic light emitting display device that sequentially displays a previous frame and a current frame. Previous data of the pixel circuit may correspond to the previous frame, and current data of the pixel circuit may correspond to the current frame. When the current data is substantially the same as the previous data that was previously stored in the storage capacitor, the previous data in the storage capacitor may be maintained. When the current data is different from the previous data, the previous data in the storage capacitor may be changed into the current data.

In an example embodiment, when the current data is substantially the same as the previous data, the first and third PMOS transistors may be turned on in response to a scan signal received from the scan line, and the second and fourth PMQS transistors may be turned off in response to a first data signal received from the first data line and a second data signal received from the second data line.

When the current data is substantially the same as the previous data, the scan signal may have a low voltage level, and each of the first and second data signals may have a high voltage level.

In an example embodiment, when the current data is different from the previous data, the first and third PMOS transistors may be turned on in response to a scan signal received from the scan line, and one of the second and fourth PMOS transistors may be selectively turned on in response to a first data signal received from the first data line and a second data signal received from the second data line.

When the previous data corresponds to a logic low level and the current data corresponds to a logic high level, the scan signal may have a low voltage level, the first data signal may have the low voltage level to turn on the second PMOS transistor, and the second data signal may have a high voltage level to turn off the fourth PMOS transistor.

When the previous data corresponds to a logic high level and the current data corresponds to a logic low level, the scan signal may have a low voltage level, the first data signal may have a high voltage level to turn off the second PMOS transistor, and the second data signal may have the low voltage level to turn on the fourth PMOS transistor.

In an example embodiment, the first voltage may have a level that is substantially the same as a level of the first power supply voltage.

In an example embodiment, the second voltage may have a level that is substantially the same as a level of the second power supply voltage.

According to example embodiments, a pixel circuit includes a first n-type metal oxide semiconductor (NMOS) transistor, a second NMOS transistor, a third NMOS transistor, a fourth NMOS transistor, an organic light emitting diode, a fifth NMOS transistor and a storage capacitor. The first NMOS transistor has a first electrode connected to a first voltage, a gate electrode connected to a scan line, and a second electrode. The second NMOS transistor has a first electrode connected to the second electrode of the first NMOS transistor, a gate electrode connected to a first data line, and a second electrode connected to a first node. The third NMOS transistor has a first electrode connected to a second voltage, a gate electrode connected to the scan line, and a second electrode. The fourth NMOS transistor has a first electrode connected to the second electrode of the third NMOS transistor, a gate electrode connected to a second data line, and a second electrode connected to the first node. The organic light emitting diode has an anode electrode connected to a first power supply voltage, and a cathode electrode. The fifth NMOS transistor has a first electrode connected to the cathode electrode of the organic light emitting diode, a gate electrode connected to the first node, and a second electrode connected to a second power supply voltage. The storage capacitor has a first electrode connected to the first node, and a second electrode connected to the second electrode of the fifth NMOS transistor.

The pixel circuit may be included in an organic light emitting display device that sequentially displays a previous frame and a current frame. Previous data of the pixel circuit may correspond to the previous frame, and current data of the pixel circuit may correspond to the current frame. When the current data is substantially the same as the previous data that was previously stored in the storage capacitor, the previous data in the storage capacitor may be maintained. When the current data is different from the previous data, the previous data in the storage capacitor may be changed into the current data.

In an example embodiment, when the current data is substantially the same as the previous data, the first and third NMOS transistors may be turned on in response to a scan signal received from the scan line, and the second and fourth NMOS transistors may be turned off in response to a first data signal received from the first data line and a second data signal received from the second data line.

When the current data is substantially the same as the previous data, the scan signal may have a high voltage level, and each of the first and second data signals may have a low voltage level.

In an example embodiment, when the current data is different from the previous data, the first and third NMOS transistors may be turned on in response to a scan signal received from the scan line, and one of the second and fourth NMOS transistors may be selectively turned on in response to a first data signal received from the first data line and a second data signal received from the second data line.

When the previous data corresponds to a logic low level and the current data corresponds to a logic high level, the scan signal may have a high voltage level, the first data signal may have the high voltage level to turn on the second NMOS transistor, and the second data signal may have a low voltage level to turn off the fourth NMOS transistor.

When the previous data corresponds to a logic high level and the current data corresponds to a logic low level, the scan signal may have a high voltage level, the first data signal may have a low voltage level to turn off the second NMOS transistor, and the second data signal may have the high voltage level to turn on the fourth NMOS transistor.

In an example embodiment, the first voltage may have a level that is substantially the same as a level of the first power supply voltage.

In an example embodiment, the second voltage may have a level that is substantially the same as a level of the second power supply voltage.

According to example embodiments, an organic light emitting display device includes a pixel unit, a scan driving unit, a data driving unit, a power unit and a timing control unit. The pixel unit has a plurality of pixel circuits. The scan driving unit provides a scan signal to each pixel circuit. The data driving unit provides a first data signal and a second data signal to each pixel circuit. The power unit provides a first power supply voltage and a second power supply voltage to each pixel circuit. The timing control unit controls the scan driving unit, the data driving unit and the power unit. Each pixel circuit includes a first p-type metal oxide semiconductor (PMOS) transistor, a second PMOS transistor, a third PMOS transistor, a fourth PMOS transistor, a fifth PMOS transistor, a storage capacitor and an organic light emitting diode. The first PMOS transistor has a first electrode connected to a first voltage, a gate electrode connected to a scan line, and a second electrode. The second PMOS transistor has a first electrode connected to the second electrode of the first PMOS transistor, a gate electrode connected to a first data line, and a second electrode connected to a first node. The third PMOS transistor has a first electrode connected to a second voltage, a gate electrode connected to the scan line, and a second electrode. The fourth PMOS transistor has a first electrode connected to the second electrode of the third PMOS transistor, a gate electrode connected to a second data line, and a second electrode connected to the first node. The fifth PMOS transistor has a first electrode connected to a first power supply voltage, a gate electrode connected to the first node, and a second electrode. The storage capacitor has a first electrode connected to the first node, and a second electrode connected to the first electrode of the fifth PMOS transistor. The organic light emitting diode has an anode electrode connected to the second electrode of the fifth PMOS transistor, and a cathode electrode connected to a second power supply voltage.

The organic light emitting display device may sequentially display a previous frame and a current frame. Previous data of each pixel circuit may correspond to the previous frame, and current data of each pixel circuit may correspond to the current frame. When the current data is substantially the same as the previous data that was previously stored in the storage capacitor of each pixel circuit, the previous data in the storage capacitor of each pixel circuit may be maintained. When the current data is different from the previous data, the previous data in the storage capacitor of each pixel circuit may be changed into the current data.

According to example embodiments, in a method of driving a pixel circuit including a storage capacitor and an organic light emitting diode, the pixel circuit is included in an organic light emitting display device that sequentially displays a previous frame and a current frame. It is determined whether current data is substantially the same as previous data that was previously stored in the storage capacitor. The previous data of the pixel circuit corresponds to the previous frame, and the current data of the pixel circuit corresponds to the current frame. When the current data is substantially the same as the previous data, the previous data in the storage capacitor is maintained in response to a scan signal received from a scan line, a first data signal received from a first data line and a second data signal received from a second data line. When the current data is different from the previous data, the previous data in the storage capacitor is changed into the current data in response to the scan signal, a first voltage, the first data signal, a second voltage and the second data signal. The organic light emitting diode is emitted based on data stored in the storage capacitor.

In the method of driving the pixel circuit, a refresh operation is further performed on the storage capacitor when the data stored in the storage capacitor is maintained over a predetermined time period.

Accordingly, the pixel circuit according to example embodiments may include five transistors, one storage capacitor and one organic light emitting diode, and may operate based on the digital driving scheme. The pixel circuit according to example embodiments may compare the current data that is provided to the pixel circuit with the previous data that was previously stored in the storage capacitor, and may selectively maintain the previous data in the storage capacitor or change the previous data in the storage capacitor into the current data depending on the comparison result, thereby reducing power consumption for charging and discharging a data line. The organic light emitting display device according to example embodiments may include the pixel circuit, thereby reducing power consumption.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
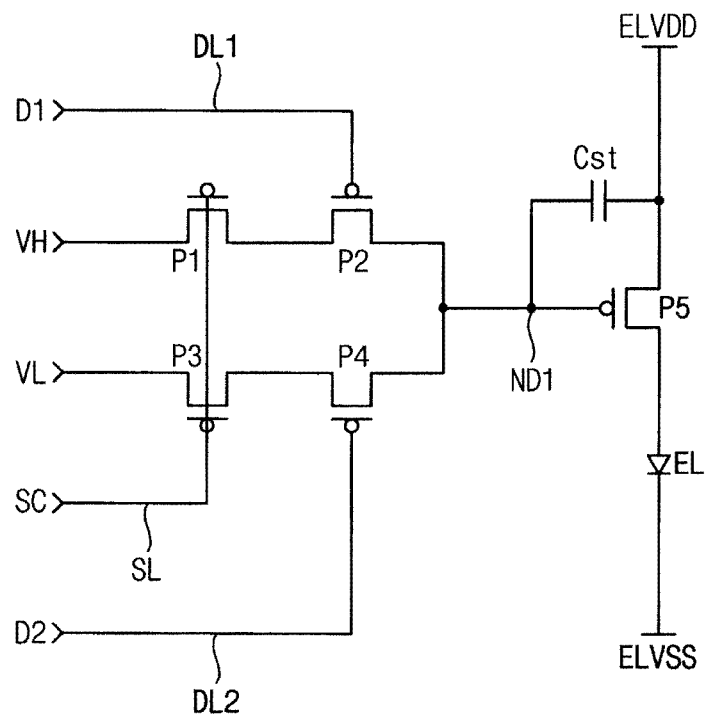
FIG. 1 is a circuit diagram illustrating a pixel circuit according to example embodiments.

Various example embodiments will be described more fully with reference to the accompanying drawings, in which embodiments are shown. The present embodiments may, however, be embodied in many different forms and should not be construed as limited to the embodiments set forth herein. Rather, these embodiments are provided so that this disclosure will be thorough and complete, and will fully convey the scope of the present embodiments to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the present embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which the present embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a circuit diagram illustrating a pixel circuit according to example embodiments.

Referring to FIG. 1, a pixel circuit 100a includes a first p-type metal oxide semiconductor (PMOS) transistor P1, a second PMOS transistor P2, a third PMOS transistor P3, a fourth PMOS transistor P4, a fifth PMOS transistor P5, a storage capacitor Cst and an organic light emitting diode EL. The pixel circuit 100a may have a 5T-1C structure (e.g., a structure having five transistors and one capacitor).

The first PMOS transistor P1 and the second PMOS transistor P2 are connected in serial between a first voltage VH and a first node ND1. For example, the first PMOS transistor P1 includes a first electrode (e.g., a source electrode) that is connected to the first voltage VH, a gate electrode that is connected to a scan line SL, and a second electrode (e.g., a drain electrode). The second PMOS transistor P2 includes a first electrode (e.g., a source electrode) that is connected to the second electrode of the first PMOS transistor P1, a gate electrode that is connected to a first data line DL1, and a second electrode (e.g., a drain electrode) that is connected to the first node ND1. The first PMOS transistor P1 and the second PMOS transistor P2 may form a first path to selectively provide the first voltage VH to the first node ND1 in response to a scan signal SC that is received from the scan line SL and a first data signal D1 that is received from the first data line DL1.

The third PMOS transistor P3 and the fourth PMOS transistor P4 are connected in serial between a second voltage VL and the first node ND1. For example, the third PMOS transistor P3 includes a first electrode (e.g., a source electrode) that is connected to the second voltage VL, a gate electrode that is connected to the scan line SL, and a second electrode (e.g., a drain electrode). The fourth PMOS transistor P4 includes a first electrode (e.g., a source electrode) that is connected to the second electrode of the third PMOS transistor P3, a gate electrode that is connected to a second data line DL2, and a second electrode (e.g., a drain electrode) that is connected to the first node ND1. The third PMOS transistor P3 and the fourth PMOS transistor P4 may form a second path to selectively provide the second voltage VL to the first node ND1 in response to the scan signal SC and a second data signal D2 that is received from the second data line DL2.

The first voltage VH may have a level higher than a level of the second voltage VL. In some embodiments, as will be described later with reference to FIGS. 3 and 5, the level of the first voltage VH may be substantially the same as a level of a first power supply voltage ELVDD. In some embodiments, as will be described later with reference to FIGS. 4 and 5, the level of the second voltage VL may be substantially the same as a level of a second power supply voltage ELVSS.

The fifth PMOS transistor P5 includes a first electrode (e.g., a source electrode) that is connected to the first power supply voltage ELVDD, a gate electrode that is connected to the first node ND1, and a second electrode (e.g., a drain electrode). The fifth PMOS transistor P5 may operate as a driving transistor that controls a current flowing through the organic light emitting diode EL.

The storage capacitor Cst is connected between the first node ND1 and the first electrode of the fifth PMOS transistor P5. For example, the storage capacitor Cst includes a first electrode that is connected to the first node ND1 and a second electrode connected to the first electrode of the fifth PMOS transistor P5.

The organic light emitting diode EL is connected between the fifth PMOS transistor P5 and the second power supply voltage ELVSS. For example, the organic light emitting diode EL includes an anode electrode that is connected to the second electrode of the fifth PMOS transistor P5, and a cathode electrode that is connected to the second power supply voltage ELVSS.

Although not illustrated in FIG. 1, the organic light emitting diode EL may internally include a parasitic capacitor (not shown) that is generated by the anode electrode and the cathode electrode of the organic light emitting diode EL. The parasitic capacitor that internally exists in the organic light emitting diode EL may be illustrated between the anode electrode and the cathode electrode of the organic light emitting diode EL in FIG. 1.

In example embodiments, the pixel circuit 100a may be included in an organic light emitting display device that sequentially displays a previous frame and a current frame. Previous data of the pixel circuit 100a may correspond to the previous frame, and current data of the pixel circuit 100a may correspond to the current frame. When the current data that is provided to the pixel circuit 100a is substantially the same as the previous data that was previously stored in the storage capacitor Cst, the current data may not be stored in the storage capacitor Cst, the previous data in the storage capacitor Cst may be maintained, and the organic light emitting display device may display the current frame based on the previous data. When the current data is different from the previous data, the previous data in the storage capacitor Cst may be changed into the current data, and the organic light emitting display device may display the current frame based on the current data.

Hereinafter, operations of the pixel circuit according to example embodiments will be explained in detail with reference to FIGS. 2A, 2B and 2C.

Figure 2A:
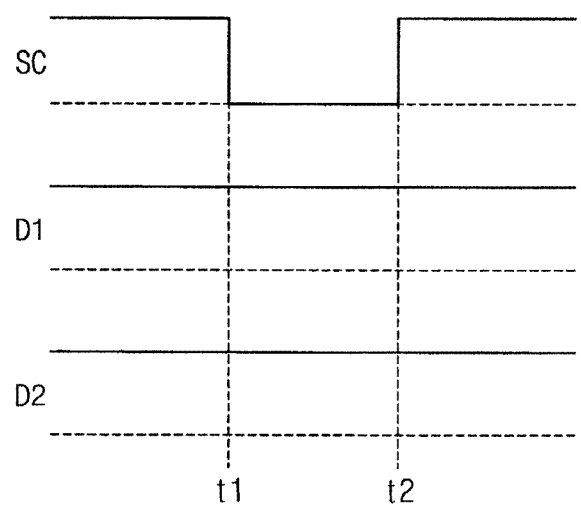
FIGS. 2A, 2B and 2C are diagrams for describing operations of the pixel circuit of FIG. 1.
Figure 2B:
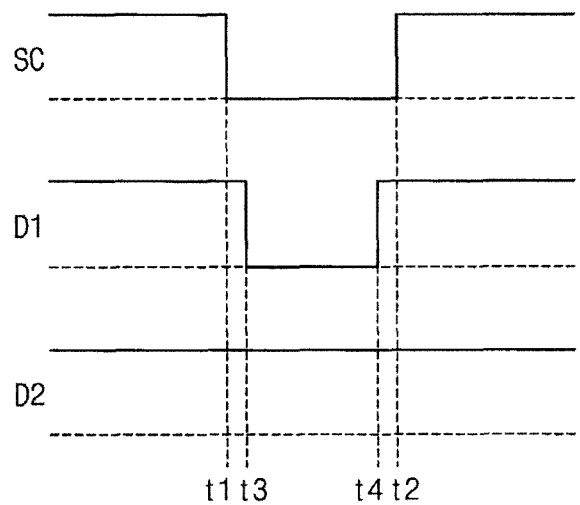
Figure 2C:
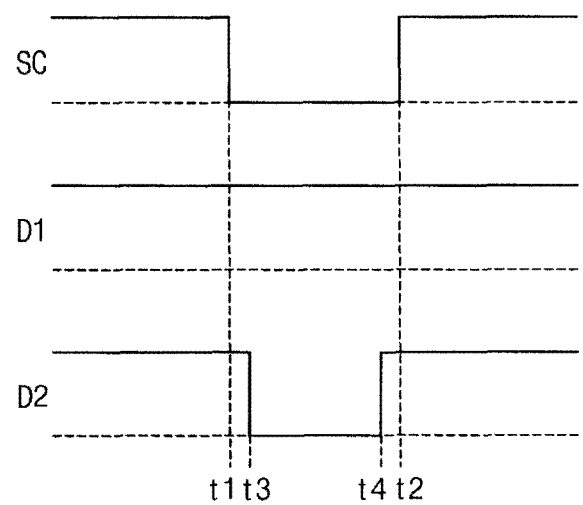

FIGS. 2A, 2B and 2C are diagrams for describing operations of the pixel circuit of FIG. 1. FIG. 2A is a timing diagram illustrating an operation of the pixel circuit 100a when the current data is substantially the same as the previous data. FIGS. 2B and 2C are timing diagrams illustrating operations of the pixel circuit 100a when the current data is different from the previous data.

Referring to FIGS. 1 and 2A, when the current data is substantially the same as the previous data (e.g., when both the previous data and the current data correspond to logic low levels or when both the previous data and the current data correspond to logic high levels), the previous data in the storage capacitor Cst may be maintained.

During a time period for storing data in the storage capacitor Cst (e.g., from time t1 to time t2), the scan signal SC is activated to have a low voltage level, and the first and third PMOS transistors P1, P3 are turned on. The first data signal D1 is deactivated to have a high voltage level, and the second PMOS transistor P2 is turned off. The second data signal D2 is deactivated to have the high voltage level, and the fourth PMOS transistor P4 is turned off. Both the first and second paths are disabled, and both the first voltage VH and the second voltage VL are not applied to the first node ND1. Thus, the previous data that was previously stored in the storage capacitor Cst is maintained. During a light emitting period after time t2, the organic light emitting diode EL is driven based on the previous data in the storage capacitor Cst.

Referring to FIGS. 1 and 2B, when the current data is different from the previous data (e.g., when the previous data corresponds to the logic low level and the current data corresponds to the logic high level), the previous data in the storage capacitor Cst may be changed into the current data.

During the time period for storing data in the storage capacitor Cst (e.g., from time t1 to time t2), the scan signal SC is activated to have the low voltage level, and the first and third PMOS transistors P1, P3 are turned on. The second data signal D2 is deactivated to have the high voltage level, and the fourth PMOS transistor P4 is turned off. During a time period from time t3 to time t4, the first data signal D1 is activated to have the low voltage level, and the second PMOS transistor P2 is turned on. The first path is enabled, the second path is disabled, and the first voltage VH is applied to the first node ND1. Thus, the previous data that was previously stored in the storage capacitor Cst is changed into the current data corresponding to the logic high level. During the light emitting period after time t2, the organic light emitting diode EL is driven based on the current data in the storage capacitor Cst.

To prevent coupling between the first PMOS transistor P1 and the second PMOS transistor P2, an activation period (e.g., from time t1 to time t2) of the first PMOS transistor P1 may be different from an activation period (e.g., from time t3 to time t4) of the second PMOS transistor P2. In some embodiments, the activation period of the first PMOS transistor P1 may be substantially the same as the activation period of the second PMOS transistor P2.

Referring to FIGS. 1 and 2C, when the current data is different from the previous data (e.g., when the previous data corresponds to the logic high level and the current data corresponds to the logic low level), the previous data in the storage capacitor Cst may be changed into the current data.

During the time period for storing data in the storage capacitor Cst (e.g., from time t1 to time t2), the scan signal SC is activated to have the low voltage level, and the first and third PMOS transistors P1, P3 are turned on. The first data signal D1 is deactivated to have the high voltage level, and the second PMOS transistor P2 is turned off. During the time period from time t3 to time t4, the second data signal D2 is activated to have the low voltage level, and the fourth PMOS transistor P4 is turned on. The first path is disabled, the second path is enabled, and the second voltage VL is applied to the first node ND1. Thus, the previous data that was previously stored in the storage capacitor Cst is changed into the current data corresponding to the logic low level. During the light emitting period after time t2, the organic light emitting diode EL is driven based on the current data in the storage capacitor Cst.

To prevent coupling between the third PMOS transistor P3 and the fourth PMOS transistor P4, an activation period (e.g., from time t1 to time t2) of the third PMOS transistor P3 may be different from an activation period (e.g., from time t3 to time t4) of the fourth PMOS transistor P4. In some embodiments, the activation period of the third PMOS transistor P3 may be substantially the same as the activation period of the fourth PMOS transistor P4.

As described above with reference to FIGS. 2B and 2C, when the current data is different from the previous data, one of the second PMOS transistors P2 and the fourth PMOS transistor P4 may be selectively turned on in response to the first data signal D1 and the second data signal D2. One of the first path and the second path may be selectively enabled. Data that was previously stored in the storage capacitor Cst may be changed based on a voltage that is applied to the first node ND1 through the enabled path.

The pixel circuit according to example embodiments may be implemented with the structure illustrated in FIG. 1, and may operate based on a digital driving scheme such that a gray level of the pixel circuit is controlled by adjusting a light emitting time. The pixel circuit 100a of FIG. 1 may maintain the previous data in the storage capacitor Cst when the current data is substantially the same as the previous data, and may drive the organic light emitting diode EL based on the previous data. The pixel circuit 100a may change the previous data in the storage capacitor Cst into the current data when the current data is different from the previous data, and may drive the organic light emitting diode EL based on the current data. Thus, the pixel circuit 100a may have relatively low power consumption for charging and discharging the data line, and an organic light emitting display device including the pixel circuit 100a may have relatively low power consumption.

Figure 3:
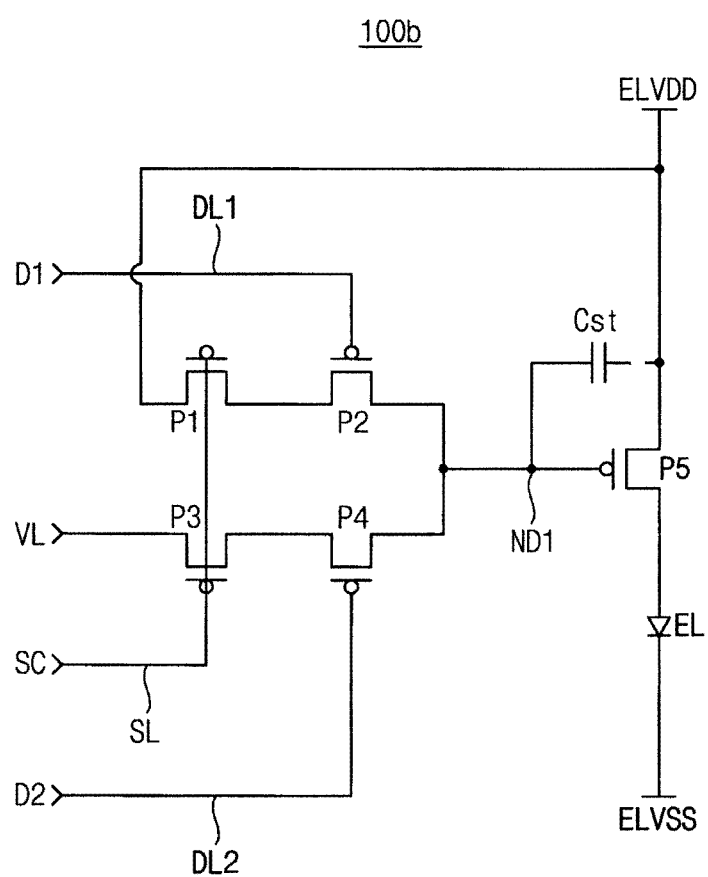
FIGS. 3, 4 and 5 are circuit diagrams illustrating a pixel circuit according to example embodiments.
Figure 4:
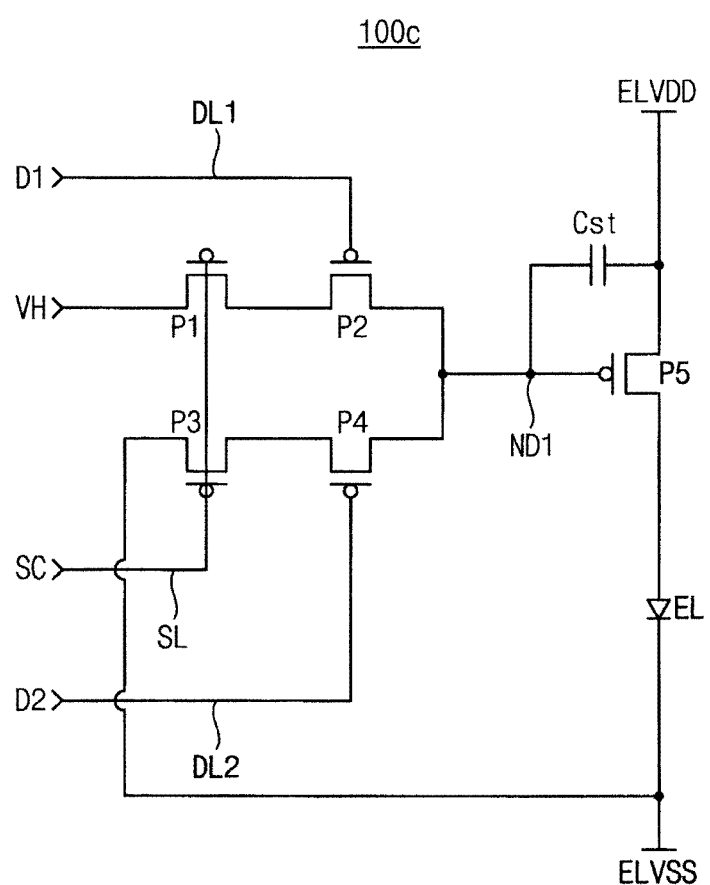
Figure 5:
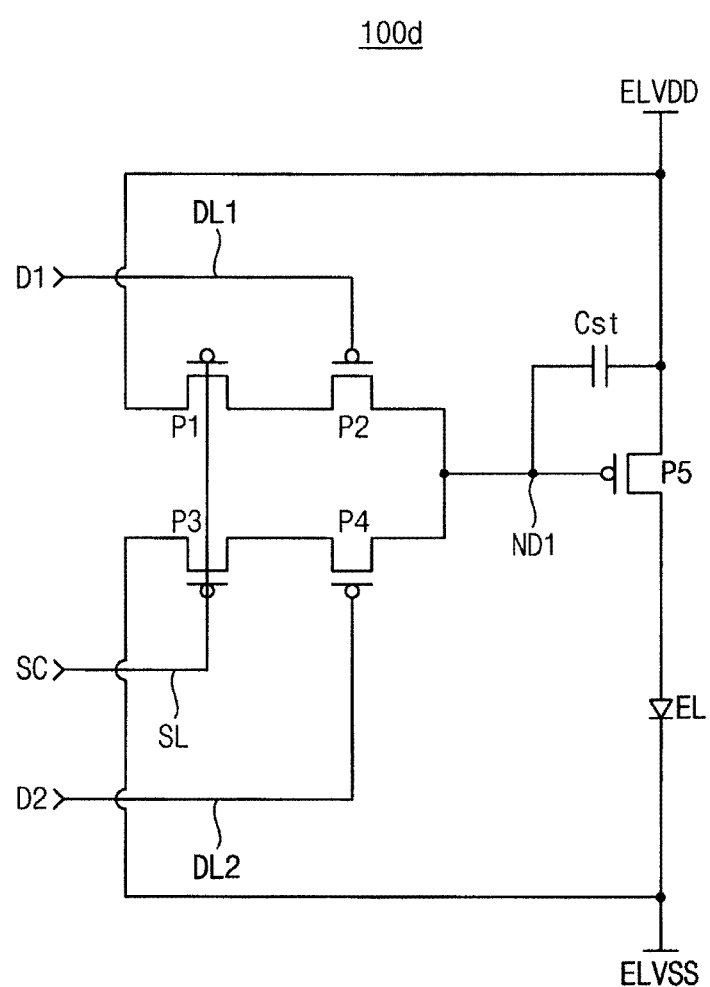

FIGS. 3, 4 and 5 are circuit diagrams illustrating a pixel circuit according to example embodiments.

Referring to FIG. 3, a pixel circuit 100b includes a first PMOS transistor P1, a second PMOS transistor P2, a third PMOS transistor P3, a fourth PMOS transistor P4, a fifth PMOS transistor P5, a storage capacitor Cst and an organic light emitting diode EL.

In an example embodiment of FIG. 3, a first voltage VH may have a level that is substantially the same as a level of a first power supply voltage ELVDD. Thus, the first PMOS transistor P1 in FIG. 3 may have a structure different from a structure of the first PMOS transistor P1 in FIG. 1. The other transistors P2, P3, P4 and P5, the storage capacitor Cst and the organic light emitting diode EL in FIG. 3 may be substantially the same as the transistors P2, P3, P4 and P5, the storage capacitor Cst and the organic light emitting diode EL in FIG. 1, respectively. The operation of the pixel circuit 100b of FIG. 3 may be substantially the same as the operation of the pixel circuit 100a of FIG. 1, which is described above with reference to FIGS. 2A, 2B and 2C.

The first PMOS transistor P1 and the second PMOS transistor P2 are connected in serial between the first power supply voltage ELVDD and a first node ND1. For example, the first PMOS transistor P1 includes a first electrode that is connected to the first power supply voltage ELVDD, a gate electrode that is connected to a scan line SL, and a second electrode. The second PMOS transistor P2 includes a first electrode that is connected to the second electrode of the first PMOS transistor P1, a gate electrode that is connected to a first data line DL1, and a second electrode that is connected to the first node ND1. The first PMOS transistor P1 and the second PMOS transistor P2 may form a first path to selectively provide the first power supply voltage ELVDD to the first node ND1 in response to a scan signal SC and a first data signal D1.

Referring to FIG. 4, a pixel circuit 100c includes a first PMOS transistor P1, a second PMOS transistor P2, a third PMOS transistor P3, a fourth PMOS transistor P4, a fifth PMOS transistor P5, a storage capacitor Cst and an organic light emitting diode EL.

In an example embodiment of FIG. 4, a second voltage VL may have a level that is substantially the same as a level of a second power supply voltage ELVSS. Thus, the third PMOS transistor P3 in FIG. 4 may have a structure different from a structure of the third PMOS transistor P3 in FIG. 1. The other transistors P1, P2, P4 and P5, the storage capacitor Cst and the organic light emitting diode EL in FIG. 4 may be substantially the same as the transistors P1, P2, P4 and P5, the storage capacitor Cst and the organic light emitting diode EL in FIG. 1, respectively. The operation of the pixel circuit 100c of FIG. 4 may be substantially the same as the operation of the pixel circuit 100a of FIG. 1, which is described above with reference to FIGS. 2A, 2B and 2C.

The third PMOS transistor P3 and the fourth PMOS transistor P4 are connected in serial between the second power supply voltage ELVSS and a first node ND1. For example, the third PMOS transistor P3 includes a first electrode that is connected to the second power supply voltage ELVSS, a gate electrode that is connected to a scan line SL, and a second electrode. The fourth PMOS transistor P4 includes a first electrode that is connected to the second electrode of the third PMOS transistor P3, a gate electrode that is connected to a second data line DL2, and a second electrode that is connected to the first node ND1. The third PMOS transistor P3 and the fourth PMOS transistor P4 may form a second path to selectively provide the second power supply voltage ELVSS to the first node ND1 in response to a scan signal SC and a second data signal D2.

Referring to FIG. 5, a pixel circuit 100d includes a first PMOS transistor P1, a second PMOS transistor P2, a third PMOS transistor P3, a fourth PMOS transistor P4, a fifth PMOS transistor P5, a storage capacitor Cst and an organic light emitting diode EL.

In an example embodiment of FIG. 5, a first voltage VH may have a level that is substantially the same as a level of a first power supply voltage ELVDD, and a second voltage VL may have a level that is substantially the same as a level of a second power supply voltage ELVSS. Thus, the first and third PMOS transistors P1, P3 in FIG. 5 may have structures different from structures of the first and third PMOS transistors P1, P3 in FIG. 1. The other transistors P2, P4 and P5, the storage capacitor Cst and the organic light emitting diode EL in FIG. 5 may be substantially the same as the transistors P2, P4 and P5, the storage capacitor Cst and the organic light emitting diode EL in FIG. 1, respectively. The operation of the pixel circuit 100d of FIG. 5 may be substantially the same as the operation of the pixel circuit 100a of FIG. 1, which is described above with reference to FIGS. 2A, 2B and 2C.

The first PMOS transistor P1 and the second PMOS transistor P2 are connected in serial between the first power supply voltage ELVDD and a first node ND1. For example, the first PMOS transistor P1 includes a first electrode that is connected to the first power supply voltage ELVDD, a gate electrode that is connected to a scan line SL, and a second electrode. The second PMOS transistor P2 includes a first electrode that is connected to the second electrode of the first PMOS transistor P1, a gate electrode that is connected to a first data line DL1, and a second electrode that is connected to the first node ND1. The first PMOS transistor P1 and the second PMOS transistor P2 may form a first path to selectively provide the first power supply voltage ELVDD to the first node ND1 in response to a scan signal SC and a first data signal D1.

The third PMOS transistor P3 and the fourth PMOS transistor P4 are connected in serial between the second power supply voltage ELVSS and the first node ND1. For example, the third PMOS transistor P3 includes a first electrode that is connected to the second power supply voltage ELVSS, a gate electrode that is connected to the scan line SL, and a second electrode. The fourth PMOS transistor P4 includes a first electrode that is connected to the second electrode of the third PMOS transistor P3, a gate electrode that is connected to a second data line DL2, and a second electrode that is connected to the first node ND1. The third PMOS transistor P3 and the fourth PMOS transistor P4 may form a second path to selectively provide the second power supply voltage ELVSS to the first node ND1 in response to the scan signal SC and a second data signal D2.

As described above with reference to FIGS. 3, 4 and 5, the first voltage VH may be replaced with the first power supply voltage ELVDD and/or the second voltage VL may be replaced with the second power supply voltage ELVSS. Thus, an organic light emitting display device including at least one of the pixel circuits 100b, 100c and 100d may be implemented without additional elements for providing at least one of the first voltage VH and the second voltage VL.

Figure 6:
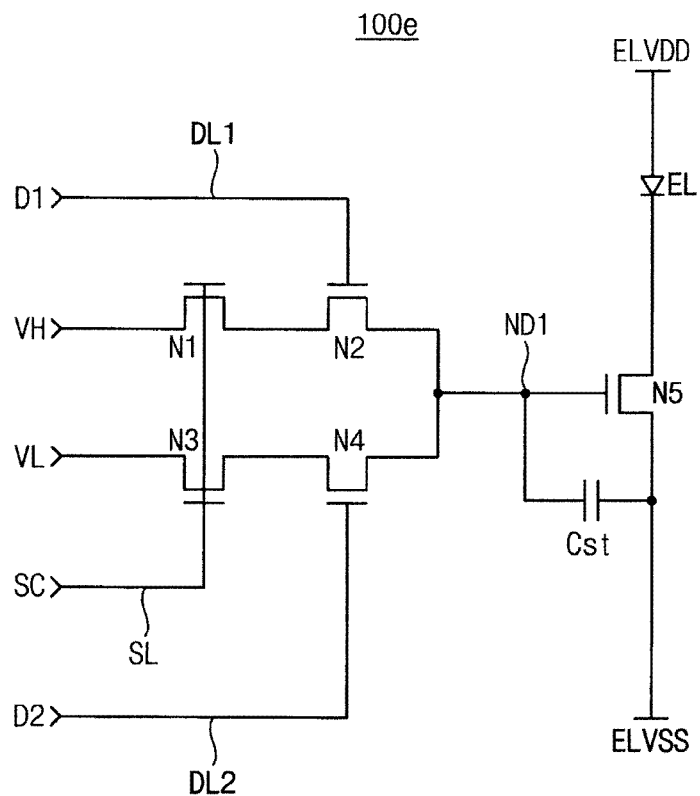
FIG. 6 is a circuit diagram lustrating a pixel circuit according to example embodiments.

FIG. 6 is a circuit diagram illustrating a pixel circuit according to example embodiments.

Referring to FIG. 6, a pixel circuit 100e includes a first n-type metal oxide semiconductor (NMOS) transistor N1, a second NMOS transistor N2, a third NMOS transistor N3, a fourth NMOS transistor N4, a fifth NMOS transistor N5, a storage capacitor Cst and an organic light emitting diode EL. The pixel circuit 100e may have a 5T-1C structure.

The first NMOS transistor N1 and the second NMOS transistor N2 are connected in serial between a first voltage VH and a first node ND1. For example, the first NMOS transistor N1 includes a first electrode (e.g., a drain electrode) that is connected to the first voltage VH, a gate electrode that is connected to a scan line SL, and a second electrode (e.g., a source electrode). The second NMOS transistor N2 includes a first electrode (e.g., a drain electrode) that is connected to the second electrode of the first NMOS transistor N1, a gate electrode that is connected to a first data line DL1, and a second electrode (e.g., a source electrode) that is connected to the first node ND1. The first NMOS transistor N1 and the second NMOS transistor N2 may form a first path to selectively provide the first voltage VH to the first node ND1 in response to a scan signal SC that is received from the scan line SL and a first data signal D1 that is received from the first data line DL1.

The third NMOS transistor N3 and the fourth NMOS transistor N4 are connected in serial between a second voltage VL and the first node ND1. For example, the third NMOS transistor N3 includes a first electrode (e.g., a drain electrode) that is connected to the second voltage VL, a gate electrode that is connected to the scan line SL, and a second electrode (e.g., a source electrode). The fourth NMOS transistor N4 includes a first electrode (e.g., a drain electrode) that is connected to the second electrode of the third NMOS transistor N3, a gate electrode that is connected to a second data line DL2, and a second electrode (e.g., a source electrode) that is connected to the first node ND1. The third NMOS transistor N3 and the fourth NMOS transistor N4 may form a second path to selectively provide the second voltage VL to the first node ND1 in response to the scan signal SC and a second data signal D2 that is received from the second data line DL2.

The first voltage VH may have a level higher than a level of the second voltage VL. In some embodiments, as will be described later with reference to FIGS. 8 and 10, the level of the first voltage VH may be substantially the same as a level of a first power supply voltage ELVDD. In some embodiments, as will be described later with reference to FIGS. 9 and 10, the level of the second voltage VL may be substantially the same as a level of a second power supply voltage ELVSS.

The organic light emitting diode EL is connected between the first power supply voltage ELVDD and the fifth NMOS transistor N5. For example, the organic light emitting diode EL includes an anode electrode that is connected to the first power supply voltage ELVDD, and a cathode electrode that is connected to a first electrode of the fifth NMOS transistor N5.

The fifth NMOS transistor N5 includes a first electrode (e.g., a drain electrode) that is connected to the cathode electrode of the organic light emitting diode EL, a gate electrode that is connected to the first node ND1, and a second electrode (e.g., a source electrode) that is connected to the second power supply voltage ELVSS. The fifth NMOS transistor N5 may operate as a driving transistor that controls a current flowing through the organic light emitting diode EL.

The storage capacitor Cst is connected between the first node ND1 and the second electrode of the fifth NMOS transistor N5. For example, the storage capacitor Cst includes a first electrode that is connected to the first node ND1, and a second electrode connected to the second electrode of the fifth NMOS transistor N5.

In example embodiments, the pixel circuit 100e may be included in an organic light emitting display device that sequentially displays a previous frame and a current frame. Previous data of the pixel circuit 100e may correspond to the previous frame, and current data of the pixel circuit 100e may correspond to the current frame. When the current data that is provided to the pixel circuit 100e is substantially the same as the previous data that was previously stored in the storage capacitor Cst, the current data may not be stored in the storage capacitor Cst, the previous data in the storage capacitor Cst may be maintained, and the organic light emitting display device may display the current frame based on the previous data. When the current data is different from the previous data, the previous data in the storage capacitor Cst may be changed into the current data, and the organic light emitting display device may display the current frame based on the current data.

Hereinafter, operations of the pixel circuit according to example embodiments will be explained in detail with reference to FIGS. 7A, 7B and 7C.

Figure 7A:
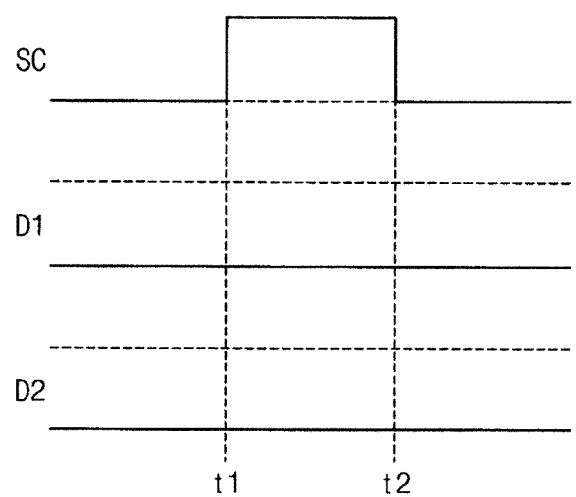
FIGS. 7A, 7B and 7C are diagrams for describing operations of the pixel circuit of FIG. 6.
Figure 7B:
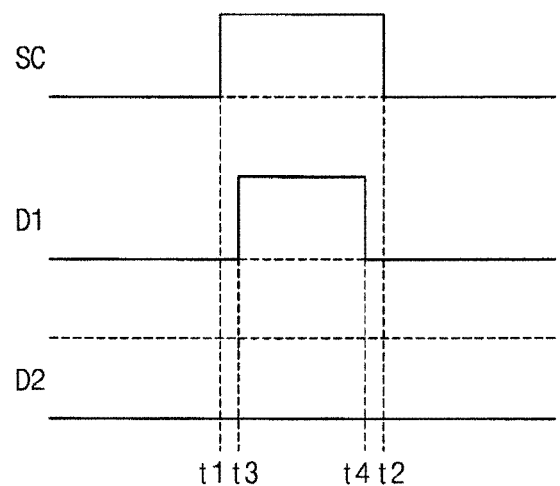
Figure 7C:
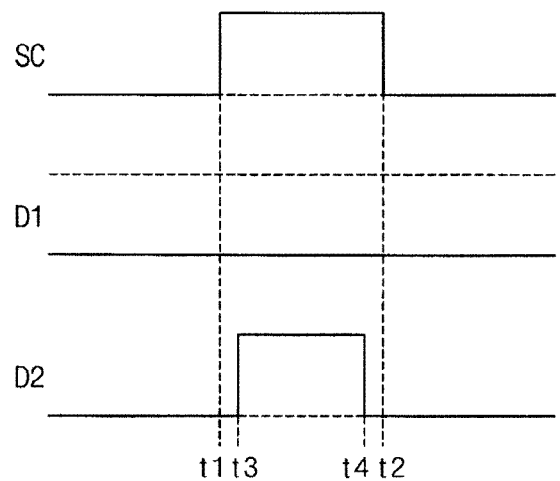

FIGS. 7A, 7B and 7C are diagrams for describing operations of the pixel circuit of FIG. 6. FIG. 7A is a timing diagram illustrating an operation of the pixel circuit 100e when the current data is substantially the same as the previous data. FIGS. 7B and 7C are timing diagrams illustrating operations of the pixel circuit 100e when the current data is different from the previous data.

Referring to FIGS. 6 and 7A, when the current data is substantially the same as the previous data, the previous data in the storage capacitor Cst may be maintained.

During a time period for storing data in the storage capacitor Cst (e.g., from time t1 to time t2), the scan signal SC is activated to have a high voltage level, and the first and third NMOS transistors N1, N3 are turned on. The first data signal D1 is deactivated to have a low voltage level, and the second NMOS transistor N2 is turned off. The second data signal D2 is deactivated to have the low voltage level, and the fourth NMOS transistor N4 is turned off. Both the first and second paths are disabled, and both the first voltage VH and the second voltage VL are not applied to the first node ND1. Thus, the previous data that was previously stored in the storage capacitor Cst is maintained. During a light emitting period after time t2, the organic light emitting diode EL is driven based on the previous data in the storage capacitor Cst.

Referring to FIGS. 6 and 7B, when the current data is different from the previous data (e.g., when the previous data corresponds to the logic low level and the current data corresponds to the logic high level), the previous data in the storage capacitor Cst may be changed into the current data.

During the time period for storing data in the storage capacitor Cst (e.g., from time t1 to time t2), the scan signal SC is activated to have the high voltage level, and the first and third NMOS transistors N1, N3 are turned on. The second data signal D2 is deactivated to have the low voltage level, and the fourth NMOS transistor N4 is turned off. During a time period from time t3 to time t4, the first data signal D1 is activated to have the high voltage level, and the second NMOS transistor N2 is turned on. The first path is enabled, the second path is disabled, and the first voltage VH is applied to the first node ND1. Thus, the previous data that was previously stored in the storage capacitor Cst is changed into the current data corresponding to the logic high level. During the light emitting period after time t2, the organic light emitting diode EL is driven based on the current data in the storage capacitor Cst.

Referring to FIGS. 6 and 7C, when the current data is different from the previous data (e.g., when the previous data corresponds to the logic high level and the current data corresponds to the logic low level), the previous data in the storage capacitor Cst may be changed into the current data.

During the time period for storing data in the storage capacitor Cst (e.g., from time t1 to time t2), the scan signal SC is activated to have the high voltage level, and the first and third NMOS transistors N1, N3 are turned on. The first data signal D1 is deactivated to have the low voltage level, and the second NMOS transistor N2 is turned off. During the time period from time t3 to time t4, the second data signal D2 is activated to have the high voltage level, and the fourth NMOS transistor N4 is turned on. The first path is disabled, the second path is enabled, and the second voltage VL is applied to the first node ND1. Thus, the previous data that was previously stored in the storage capacitor Cst is changed into the current data corresponding to the logic low level. During the light emitting period after time t2, the organic light emitting diode EL is driven based on the current data in the storage capacitor Cst.

In some embodiments, in FIG. 7B, an activation period of the first NMOS transistor N1 may be substantially the same as an activation period of the second NMOS transistor N2. In some embodiments, in FIG. 7C, an activation period of the third NMOS transistor N3 may be substantially the same as an activation period of the fourth NMOS transistor N4.

Figure 8:
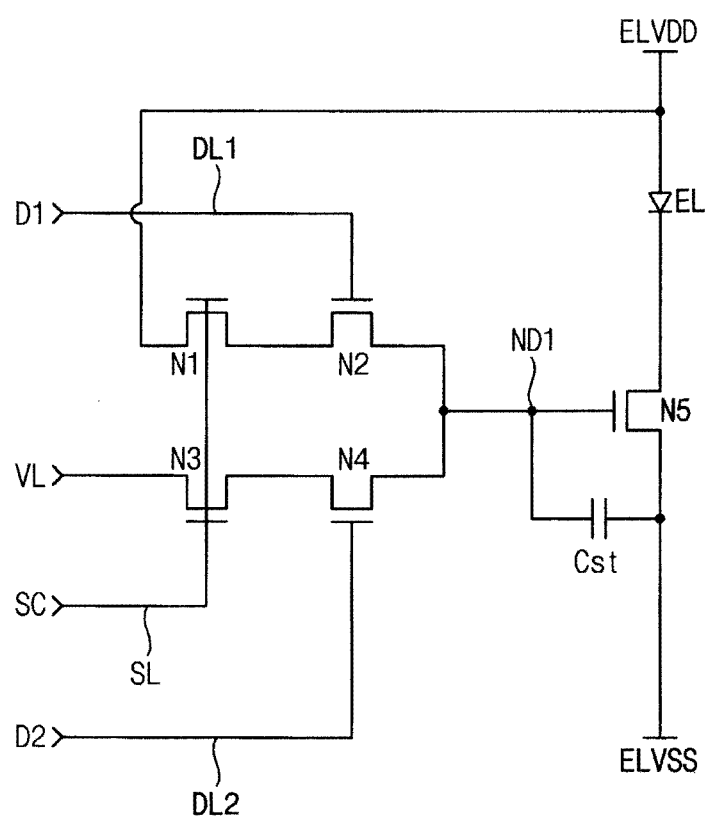
FIGS. 8, 9 and 10 are circuit diagrams illustrating a pixel circuit according to example embodiments.
Figure 9:
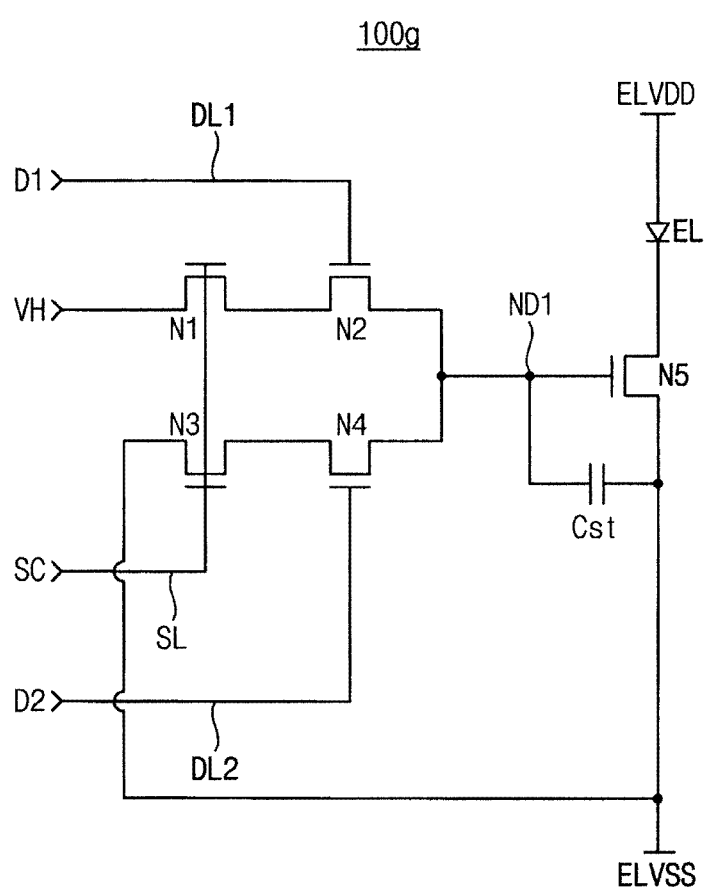
Figure 10:
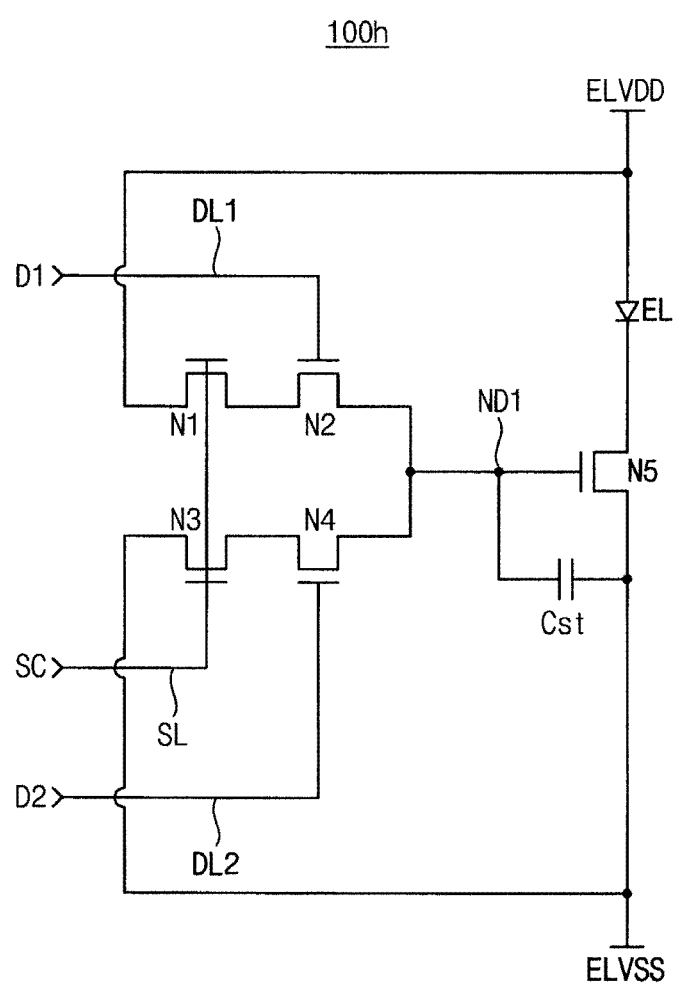

FIGS. 8, 9 and 10 are circuit diagrams illustrating a pixel circuit according to example embodiments.

Referring to FIG. 8, a pixel circuit 100f includes a first NMOS transistor N1, a second NMOS transistor N2, a third NMOS transistor N3, a fourth NMOS transistor N4, a fifth NMOS transistor N5, a storage capacitor Cst and an organic light emitting diode EL.

In an example embodiment of FIG. 8, a first voltage VH may have a level that is substantially the same as a level of a first power supply voltage ELVDD. Thus, the first NMOS transistor N1 in FIG. 8 may have a structure different from a structure of the first NMOS transistor N1 in FIG. 6.

The first NMOS transistor N1 and the second NMOS transistor N2 are connected in serial between the first power supply voltage ELVDD and a first node ND1. For example, the first NMOS transistor N1 includes a first electrode that is connected to the first power supply voltage ELVDD, a gate electrode that is connected to a scan line SL, and a second electrode. The second NMOS transistor N2 includes a first electrode that is connected to the second electrode of the first NMOS transistor N1, a gate electrode that is connected to a first data line DL1, and a second electrode that is connected to the first node ND1. The first NMOS transistor N1 and the second NMOS transistor N2 may form a first path to selectively provide the first power supply voltage ELVDD to the first node ND1 in response to a scan signal SC and a first data signal D1.

Referring to FIG. 9, a pixel circuit 100g includes a first NMOS transistor N1, a second NMOS transistor N2, a third NMOS transistor N3, a fourth NMOS transistor N4, a fifth NMOS transistor N5, a storage capacitor Cst and an organic light emitting diode EL.

In an example embodiment of FIG. 9, a second voltage VL may have a level that is substantially the same as a level of a second power supply voltage ELVSS. Thus, the third NMOS transistor N3 in FIG. 9 may have a structure different from a structure of the third NMOS transistor N3 in FIG. 6.

The third NMOS transistor N3 and the fourth NMOS transistor N4 are connected in serial between the second power supply voltage ELVSS and a first node ND1. For example, the third NMOS transistor N3 includes a first electrode that is connected to the second power supply voltage ELVSS, a gate electrode that is connected to a scan line SL, and a second electrode. The fourth NMOS transistor N4 includes a first electrode that is connected to the second electrode of the third NMOS transistor N3, a gate electrode that is connected to a second data line DL2, and a second electrode that is connected to the first node ND1. The third NMOS transistor N3 and the fourth NMOS transistor N4 may form a second path to selectively provide the second power supply voltage ELVSS to the first node ND1 in response to a scan signal SC and a second data signal D2.

Referring to FIG. 10, a pixel circuit 100h includes a first NMOS transistor N1, a second NMOS transistor N2, a third NMOS transistor N3, a fourth NMOS transistor N4, a fifth NMOS transistor N5, a storage capacitor Cst and an organic light emitting diode EL.

In an example embodiment of FIG. 10, a first voltage VH may have a level that is substantially the same as a level of a first power supply voltage ELVDD, and a second voltage VL may have a level that is substantially the same as a level of a second power supply voltage ELVSS. Thus, the first and third NMOS transistors N1, N3 in FIG. 10 may have structures different from structures of the first and third NMOS transistors N1, N3 in FIG. 6.

The first NMOS transistor N1 and the second NMOS transistor N2 are connected in serial between the first power supply voltage ELVDD and a first node ND1. For example, the first NMOS transistor N1 includes a first electrode that is connected to the first power supply voltage ELVDD, a gate electrode that is connected to a scan line SL, and a second electrode. The second NMOS transistor N2 includes a first electrode that is connected to the second electrode of the first NMOS transistor N1, a gate electrode that is connected to a first data line DL1, and a second electrode that is connected to the first node ND1. The first NMOS transistor N1 and the second NMOS transistor N2 may form a first path to selectively provide the first power supply voltage ELVDD to the first node ND1 in response to a scan signal SC and a first data signal D1.

The third NMOS transistor N3 and the fourth NMOS transistor N4 are connected in serial between the second power supply voltage ELVSS and the first node ND1. For example, the third NMOS transistor N3 includes a first electrode that is connected to the second power supply voltage ELVSS, a gate electrode that is connected to the scan line SL, and a second electrode. The fourth NMOS transistor N4 includes a first electrode that is connected to the second electrode of the third NMOS transistor N3, a gate electrode that is connected to a second data line DL2, and a second electrode that is connected to the first node ND1. The third NMOS transistor N3 and the fourth NMOS transistor N4 may form a second path to selectively provide the second power supply voltage ELVSS to the first node ND1 in response to the scan signal SC and a second data signal D2.

Figure 11:
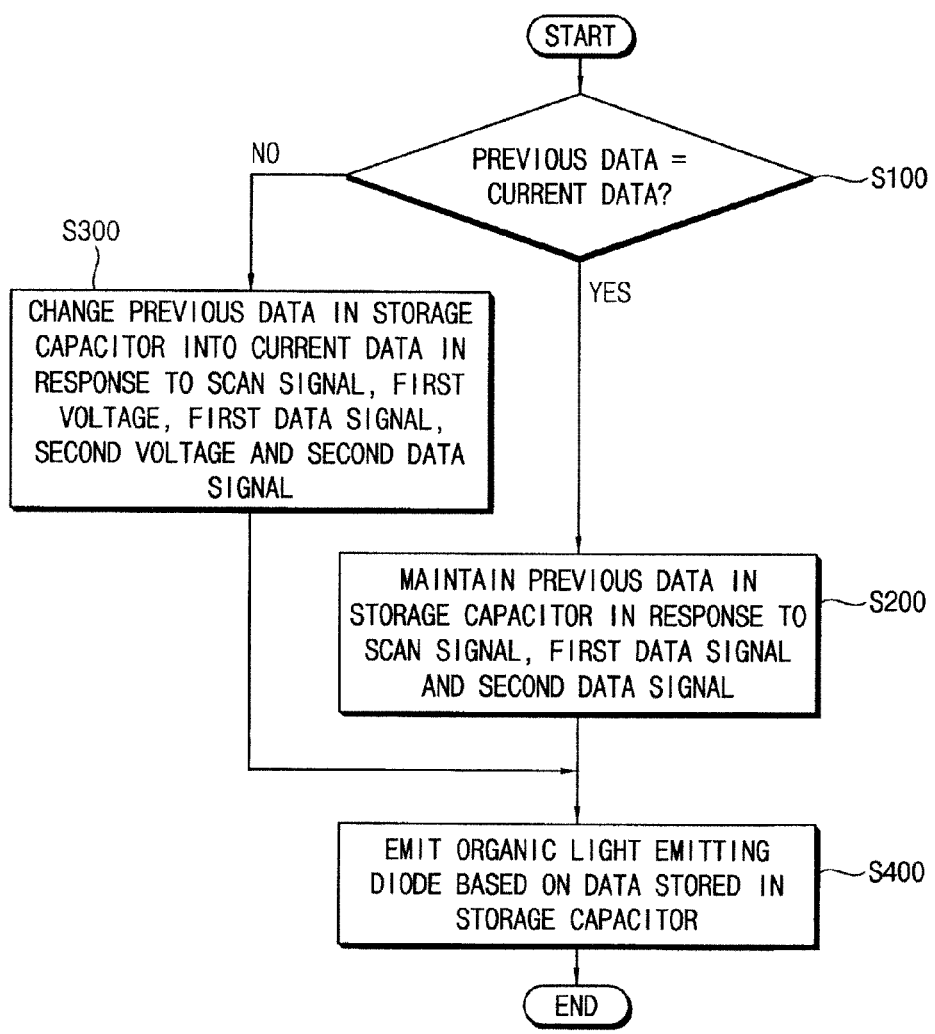
FIG. 11 is a flow chart illustrating a method of driving a pixel circuit according to example embodiments.

FIG. 11 is a flow chart illustrating a method of driving a pixel circuit according to example embodiments.

The method of FIG. 11 may be performed by one of the pixel circuit 100a of FIG. 1, the pixel circuit 100b of FIG. 3, the pixel circuit 100c of FIG. 4, the pixel circuit 100d of FIG. 5, the pixel circuit 100e of FIG. 6, the pixel circuit 100f of FIG. 8, the pixel circuit 100g of FIG. 9 and the pixel circuit 100h of FIG. 10. The method of FIG. 11 may be performed by a pixel circuit that has five transistors, one storage capacitor and one organic light emitting diode (e.g., a 5T-1C structure). The pixel circuit may be included in an organic light emitting display device that sequentially displays a previous frame and a current frame.

Referring to FIG. 11, in the method of driving the pixel circuit according to example embodiments, it is determined whether current data is substantially the same as previous data that was previously stored in the storage capacitor Cst (step S100). The previous data of the pixel circuit corresponds to the previous frame, and the current data of the pixel circuit corresponds to the current frame. The step S100 may be performed by an external control circuit (not shown), such as a timing controller in the organic light emitting display device or a processor in an electronic system including the organic light emitting display device.

When the current data is substantially the same as the previous data (step S100: YES), the previous data in the storage capacitor Cst is maintained in response to a scan signal SC received from a scan line SL, a first data signal D1 received from a first data line DL1 and a second data signal D2 received from a second data line DL2 (step S200). For example, the scan signal SC may be activated, the first data signal D1 may be deactivated, and the second data signal D2 may be deactivated. Both a first path for providing a first voltage VH (or a first power supply voltage ELVDD) and a second path for providing a second voltage VL (or a second power supply voltage ELVDD) are disabled, and thus the previous data in the storage capacitor Cst may be maintained.

When the current data is different from the previous data (step S100: NO), the previous data in the storage capacitor is changed into the current data in response to the scan signal SC, the first voltage VH, the first data signal D1, the second voltage VL and the second data signal D2 (step S300). For example, the scan signal SC may be activated, and one of the first data signal D1 and the second data signal D2 may be selectively activated. One of the first path and the second path may be selectively enabled, and thus the previous data in the storage capacitor Cst may be changed into the current data.

The organic light emitting diode EL is emitted based on data stored in the storage capacitor Cst (step S400). For example, when the previous data in the storage capacitor Cst is maintained, the organic light emitting diode EL may be emitted based on the previous data. When the previous data in the storage capacitor Cst is changed into the current data, the organic light emitting diode EL may be emitted based on the current data.

Although not illustrated in FIG. 11, in the method of driving the pixel circuit according to example embodiments, a refresh operation may be further performed on the storage capacitor when the data stored in the storage capacitor is maintained over a predetermined time period.

Figure 12:
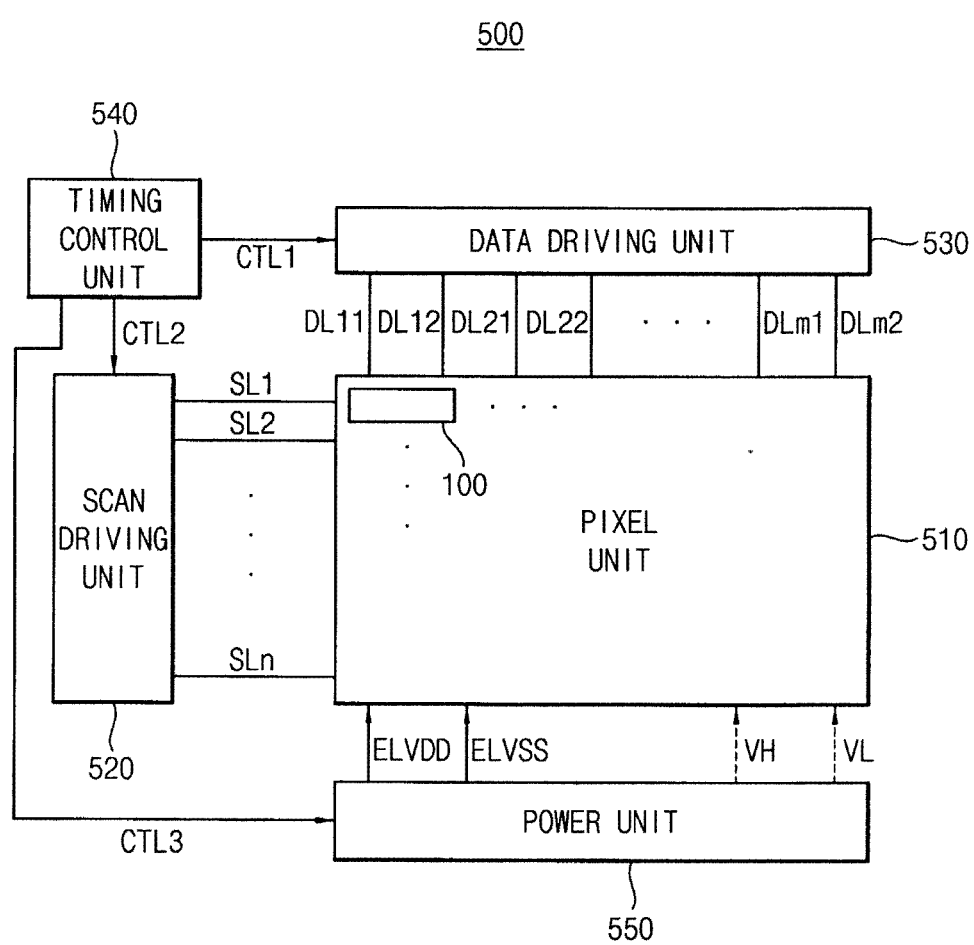
FIG. 12 is a block diagram illustrating an organic light emitting display device according to example embodiments.

FIG. 12 is a block diagram illustrating an organic light emitting display device according to example embodiments.

Referring to FIG. 12, an organic light emitting display device 500 includes a pixel unit 510, a scan driving unit 520, a data driving unit 530, a timing control unit 540 and a power unit 550. In some embodiments, the scan driving unit 520, the data driving unit 530, the timing control unit 540 and the power unit 550 may be implemented by one integrated circuit (IC).

The pixel unit 510 is connected to the scan driving unit 520 via a plurality of scan lines SL1, SL2, ..., SLn, and may be connected to the data driving unit 530 via a plurality of data line pairs DL11, DL12, DL21, DL22, ..., DLm1, DLm2. The pixel unit 510 includes a plurality of pixel circuits. Each pixel circuit 100 may be located at crossing points of the scan lines SL1, SL2, ..., SLn and the data line pairs DL11, DL12, DL21, DL22, ..., DLm1, DLm2. Thus, the pixel unit 510 may include n*m pixel circuits (e.g., the number of pixel circuits is n*m). The pixel unit 510 may receive a first power supply voltage ELVDD and a second power supply voltage ELVSS from the power unit 550. In some embodiments, the pixel unit 510 may further receive a first voltage VH and a second voltage VL from the power unit 550.

The scan driving unit 520 provides a scan signal to each pixel circuit 100 via a respective one of the scan lines SL1, SL2, ..., SLn. The data driving unit 530 provides a first data signal and a second data signal to each pixel circuit 100 via a respective one of the data line pairs DL11, DL12, DL21, DL22, . . . , DLm1, DLm2.

The timing control unit 540 controls the scan driving unit 520, the data driving unit 530 and the power unit 550 by generating and providing a plurality of timing control signals CTL1, CTL2 and CTL3 to the scan driving unit 520, the data driving unit 530 and the power unit 550, respectively. In some embodiments, the timing control unit 540 may determine whether current data corresponding to a current frame is substantially the same as previous data corresponding to a previous frame, and may perform a refresh operation on each pixel circuit when data stored in each pixel circuit is maintained over a predetermined time period.

The power unit 550 provides the first power supply voltage ELVDD and the second power supply voltage to each pixel circuit 100. The power unit 550 may further provide the first voltage VH and the second voltage VL to each pixel circuit 100.

Each pixel circuit 100 may be one of the pixel circuit 100a of FIG. 1, the pixel circuit 100b of FIG. 3, the pixel circuit 100c of FIG. 4, the pixel circuit 100d of FIG. 5, the pixel circuit 100e of FIG. 6, the pixel circuit 100f of FIG. 8, the pixel circuit 100g of FIG. 9 and the pixel circuit 100h of FIG. 10. Each pixel circuit 100 may have five transistors, one storage capacitor and one organic light emitting diode (e.g., a 5T-1C structure). Each pixel circuit 100 may be connected to a respective one of the scan lines SL1, SL2, . . . , SLn and a respective one of the data line pairs DL11, DL12, DL21, DL22, . . . , DLm1, DLm2. For example, a first pixel circuit may be connected a first scan line SL1 and a first data line pair DL11, DL12.

Each pixel circuit 100 may operate based on a digital driving scheme such that a gray level of the pixel circuit is controlled by adjusting a light emitting time. Each pixel circuit 100 may maintain the previous data in the storage capacitor Cst when the current data is substantially the same as the previous data, and may drive the organic light emitting diode EL based on the previous data. Each pixel circuit 100 may change the previous data in the storage capacitor Cst into the current data when the current data is different from the previous data, and may drive the organic light emitting diode EL based on the current data. Thus, each pixel circuit 100 may have relatively low power consumption for charging and discharging a data line, and the organic light emitting display device 500 including the pixel circuits may have relatively low power consumption.

Figure 13:
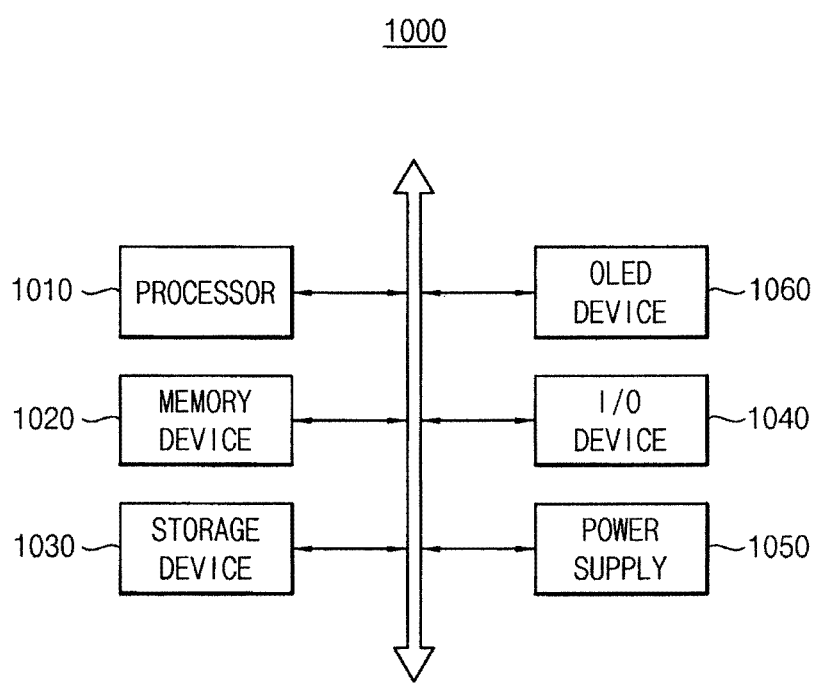
FIG. 13 is a block diagram illustrating an electronic system having an organic light emitting display device according to example embodiments.

FIG. 13 is a block diagram illustrating an electronic system having an organic light emitting display device according to example embodiments.

Referring to FIG. 13, an electronic system 1000 may include a processor 1010, a memory device 1020, a storage device 1030, an input/output (I/O) device 1040, a power supply 1050, and an organic light emitting display device 1060. The electronic system 1000 may further include a plurality of ports for communicating a video card, a sound card, a memory card, a universal serial bus (USB) device, other electronic systems, etc.

The processor 1010 may perform various computing functions. The processor 1010 may be for example, a microprocessor, a central processing unit (CPU), etc. The processor 1010 may be connected to other components via an address bus, a control bus, a data bus, etc. Further, the processor 1010 may be coupled to an extended bus such as a peripheral component interconnection (PCI) bus.

The memory device 1020 may store data for operations of the electronic system 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc.

The storage device 1030 may be, for example, a solid state drive device, a hard disk drive device, a CD-ROM device, etc. The I/O device 1040 may be, for example, an input device such as a keyboard, a keypad, a mouse, a touch screen, etc, and/or an output device such as a printer, a speaker, etc. In some embodiments, the organic light emitting display device 1060 may be included as the output device in the I/O device 1040. The power supply 1050 may provide a power for operations of the electronic system 1000. The organic light emitting display device 1060 may communicate with other components via the buses or other communication links.

The organic light emitting display device 1060 may be the organic light emitting display device 500 of FIG. 12. The organic light emitting display device 1060 may include a plurality of pixel circuits. Each pixel circuit may be one of the pixel circuit 100a of FIG. 1, the pixel circuit 100b of FIG. 3, the pixel circuit 100c of FIG. 4, the pixel circuit 100d of FIG. 5, the pixel circuit 100e of FIG. 6, the pixel circuit 100f of FIG. 8, the pixel circuit 100g of FIG. 9 and the pixel circuit 100h of FIG. 10. Each pixel circuit may have five transistors, one storage capacitor and one organic light emitting diode (e.g., a 5T-1C structure), and may operate based on the digital driving scheme. Each pixel circuit 100 may maintain the previous data in the storage capacitor Cst when the current data is substantially the same as the previous data, and may drive the organic light emitting diode EL based on the previous data. Each pixel circuit 100 may change the previous data in the storage capacitor Cst into the current data when the current data is different from the previous data, and may drive the organic light emitting diode EL based on the current data. Accordingly, the pixel circuits, the organic light emitting display device 1060 including the pixel circuits, and the electronic system 1000 including the organic light emitting display device 1060 may have relatively low power consumption.

In some embodiments, the processor 1010 may determine whether current data corresponding to a current frame is substantially the same as previous data corresponding to a previous frame, and may perform a refresh operation on each pixel circuit when data stored in each pixel circuit is maintained over a predetermined time period.

The present embodiments may be applied to an electronic system having an organic light emitting display device. For example, the present embodiments may be applied to a television, a computer monitor, a laptop, a digital camera, a cellular phone, a smart phone, a personal digital assistant (PDA), a portable multimedia player (PMP), a MP3 player, a navigation system, a video phone, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present embodiments. Accordingly, all such modifications are intended to be included within the scope of the present embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A pixel circuit, comprising:
a first p-type metal oxide semiconductor (PMOS) transistor having a first electrode connected to a first voltage, a gate electrode connected to a scan line, and a second electrode;
a second PMOS transistor having a first electrode connected to the second electrode of the first PMOS transistor, a gate electrode directly connected to a first data line, and a second electrode connected to a first node;
a third PMOS transistor having a first electrode connected to a second voltage, a gate electrode connected to the scan line, and a second electrode;
a fourth PMOS transistor having a first electrode connected to the second electrode of the third PMOS transistor, a gate electrode directly connected to a second data line, and a second electrode connected to the first node;
a fifth PMOS transistor having a first electrode connected to a first power supply voltage, a gate electrode connected to the first node, and a second electrode;
a storage capacitor having a first electrode connected to the first node, and a second electrode connected to the first electrode of the fifth PMOS transistor; and
an organic light emitting diode having an anode electrode connected to the second electrode of the fifth PMOS transistor, and a cathode electrode connected to a second power supply voltage;
wherein the pixel circuit is included in an organic light emitting display device that sequentially displays a previous frame and a current frame, previous data of the pixel circuit corresponds to the previous frame, and current data of the pixel circuit corresponds to the current frame; and
wherein when the current data is substantially the same as the previous data, the first and third PMOS transistors are turned on in response to a scan signal received from the scan line, and the second and fourth PMOS transistors are turned off in response to a first data signal received from the first data line and a second data signal received from the second data line.

2. The pixel circuit of claim 1,
wherein when the current data is substantially the same as the previous data that was previously stored in the storage capacitor, the previous data in the storage capacitor is maintained, and wherein when the current data is different from the previous data, the previous data in the storage capacitor is changed into the current data.

3. The pixel circuit of claim 1, wherein when the current data is substantially the same as the previous data, the scan signal has a low voltage level, and each of the first and second data signals has a high voltage level.

4. The pixel circuit of claim 2, wherein when the current data is different from the previous data, the first and third PMOS transistors are turned on in response to a scan signal received from the scan line, and one of the second and fourth PMOS transistors is selectively turned on in response to a first data signal received from the first data line and a second data signal received from the second data line.

5. The pixel circuit of claim 4, wherein when the previous data corresponds to a logic low level and the current data corresponds to a logic high level, the scan signal has a low voltage level, the first data signal has the low voltage level to turn on the second PMOS transistor, and the second data signal has a high voltage level to turn off the fourth PMOS transistor.

6. The pixel circuit of claim 4, wherein when the previous data corresponds to a logic high level and the current data corresponds to a logic low level, the scan signal has a low voltage level, the first data signal has a high voltage level to turn off the second PMOS transistor, and the second data signal has the low voltage level to turn on the fourth PMOS transistor.

7. The pixel circuit of claim 1, wherein the first voltage has a level that is substantially the same as a level of the first power supply voltage.

8. The pixel circuit of claim 1, wherein the second voltage has a level that is substantially the same as a level of the second power supply voltage.

9. A pixel circuit, comprising:
a first n-type metal oxide semiconductor (NMOS) transistor having a first electrode connected to a first voltage, a gate electrode connected to a scan line, and a second electrode;
a second NMOS transistor having a first electrode connected to the second electrode of the first NMOS transistor, a gate electrode directly connected to a first data line, and a second electrode connected to a first node;
a third NMOS transistor having a first electrode connected to a second voltage, a gate electrode connected to the scan line, and a second electrode;
a fourth NMOS transistor having a first electrode connected to the second electrode of the third NMOS transistor, a gate electrode directly connected to a second data line, and a second electrode connected to the first node;
an organic light emitting diode having an anode electrode connected to a first power supply voltage, and a cathode electrode;
a fifth NMOS transistor having a first electrode connected to the cathode electrode of the organic light emitting diode, a gate electrode connected to the first node, and a second electrode connected to a second power supply voltage; and
a storage capacitor having a first electrode connected to the first node, and a second electrode connected to the second electrode of the fifth NMOS transistor,
wherein the pixel circuit is included in an organic light emitting display device that sequentially displays a previous frame and a current frame, previous data of the pixel circuit corresponds to the previous frame, and current data of the pixel circuit corresponds to the current frame, and
wherein when the current data is substantially the same as the previous data, the first and third NMOS transistors are turned on in response to a scan signal received from the scan line, and the second and fourth NMOS transistors are turned off in response to a first data signal received from the first data line and a second data signal received from the second data line.

10. The pixel circuit of claim 9,
wherein when the current data is substantially the same as the previous data that was previously stored in the storage capacitor, the previous data in the storage capacitor is maintained, and wherein when the current data is different from the previous data, the previous data in the storage capacitor is changed into the current data.

11. The pixel circuit of claim 9, wherein when the current data is substantially the same as the previous data, the scan signal has a high voltage level, and each of the first and second data signals has a low voltage level.

12. The pixel circuit of claim 10, wherein when the current data is different from the previous data, the first and third NMOS transistors are turned on in response to a scan signal received from the scan line, and one of the second and fourth NMOS transistors is selectively turned on in response to a first data signal received from the first data line and a second data signal received from the second data line.

13. The pixel circuit of claim 12, wherein when the previous data corresponds to a logic low level and the current data corresponds to a logic high level, the scan signal has a high voltage level, the first data signal has the high voltage level to turn on the second NMOS transistor, and the second data signal has a low voltage level to turn off the fourth NMOS transistor.

14. The pixel circuit of claim 12, wherein when the previous data corresponds to a logic high level and the current data corresponds to a logic low level, the scan signal has a high voltage level, the first data signal has a low voltage level to turn off the second NMOS transistor, and the second data signal has the high voltage level to turn on the fourth NMOS transistor.

15. The pixel circuit of claim 9, wherein the first voltage has a level that is substantially the same as a level of the first power supply voltage.

16. The pixel circuit of claim 9, wherein the second voltage has a level that is substantially the same as a level of the second power supply voltage.

17. An organic light emitting display device, comprising:
a pixel unit having a plurality of pixel circuits;
a scan driving unit configured to provide a scan signal to each pixel circuit;
a data driving unit configured to provide a first data signal and a second data signal to each pixel circuit;
a power unit configured to provide a first power supply voltage and a second power supply voltage to each pixel circuit; and
a timing control unit configured to control the scan driving unit, the data driving unit and the power unit,
wherein each pixel circuit includes:
a first p-type metal oxide semiconductor (PMOS) transistor having a first electrode connected to a first voltage, a gate electrode connected to a scan line, and a second electrode;
a second PMOS transistor having a first electrode connected to the second electrode of the first PMOS transistor, a gate electrode directly connected to a first data line, and a second electrode connected to a first node;
a third PMOS transistor having a first electrode connected to a second voltage, a gate electrode connected to the scan line, and a second electrode;
a fourth PMOS transistor having a first electrode connected to the second electrode of the third PMOS transistor, a gate electrode directly connected to a second data line, and a second electrode connected to the first node;
a fifth PMOS transistor having a first electrode connected to the first power supply voltage, a gate electrode connected to the first node, and a second electrode;
a storage capacitor having a first electrode connected to the first node, and a second electrode connected to the first electrode of the fifth PMOS transistor; and
an organic light emitting diode having an anode electrode connected to the second electrode of the fifth PMOS transistor, and a cathode electrode connected to the second power supply voltage;
wherein the organic light emitting display device sequentially displays a previous frame and a current frame, previous data of the pixel circuit corresponds to the previous frame, and current data of the pixel circuit corresponds to the current frame, and
wherein when the current data is substantially the same as the previous data, the first and third NMOS transistors are turned on in response to a scan signal received from the scan line, and the second and fourth NMOS transistors are turned off in response to a first data signal received from the first data line and a second data signal received from the second data line.

18. The pixel circuit of claim 17,
wherein when the current data is substantially the same as the previous data that was previously stored in the storage capacitor of each pixel circuit, the previous data in the storage capacitor of each pixel circuit is maintained, and wherein when the current data is different from the previous data, the previous data in the storage capacitor of each pixel circuit is changed into the current data.

* * * * *